Feb. 7, 1928.

C. FISCHER 1,658,160

BATTERY TERMINAL CLAMP

Filed March 24, 1927

Inventor
Carl Fischer.
By Erich H. Michaelis
Attorney

Patented Feb. 7, 1928.

1,658,160

UNITED STATES PATENT OFFICE.

CARL FISCHER, OF CHICAGO, ILLINOIS.

BATTERY TERMINAL CLAMP.

Application filed March 24, 1927. Serial No. 177,9..

The invention relates to battery terminal clamps and more especially to clamps used in connection with storage batteries as commonly employed in automobiles, radio receiving sets and the like.

Clamps heretofore known and used had to be soldered to the end of the cable to be connected with the battery in order to insure a permanent connection between the terminal clamp and the cable. The object of the present invention is to do away with the soldering operation and to provide a terminal clamp which will be fastened in one operation to the battery and to the end of the electric cable. A further object of the invention is to provide a clamp consisting of one part which may be easily produced by casting. Other objects of the invention not specifically mentioned may be easily ascertained and understood from the following specification on hand of the drawings forming a part thereof and showing a preferred embodiment of the invention.

Figure 1:
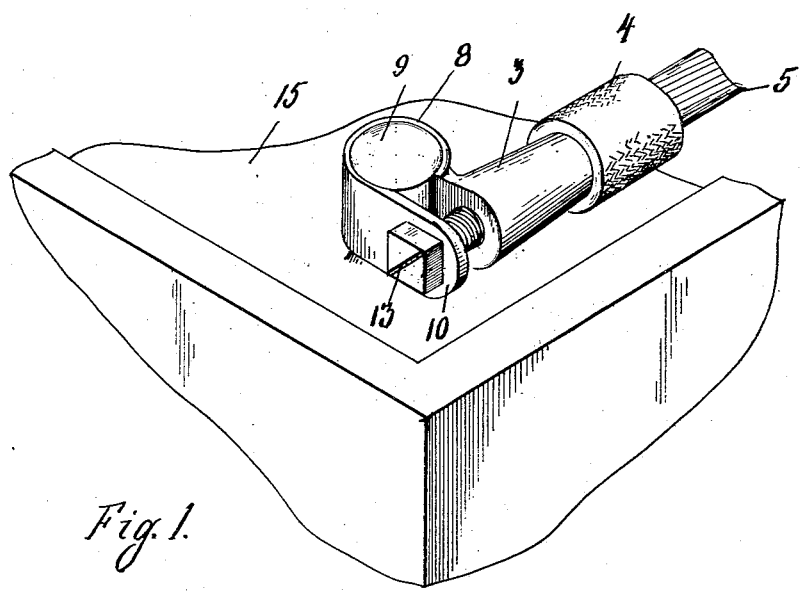
Figure 2:
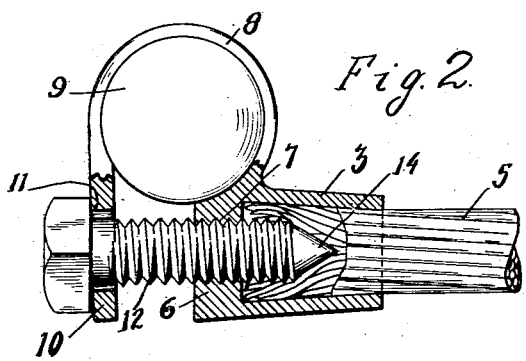

In the drawings Figure 1 is a perspective view showing the clamp on the battery terminal and connected to the end of an electric cable. Figure 2 is a longitudinal section through the clamp showing the method of fastening the clamp to the battery terminal and of securing the end of a cable to the clamp The clamp has a tubular portion 3 which has a conical shape as shown in the drawings. The bore of the sleeve has also a conical shape, and the mouth of the bore is big enough to permit of introducing the end of an electric cable as commonly used in connection with storage batteries. It is to be understood that the insulation 4 of the cable 5 is to be removed in order to reduce the outside diameter of the cable 5 to let the cable enter the mouth of the tubular portion 3 and in order to make an electric contact between the cable and the clamp possible. On its inner end the tubular portion is closed by a wall 6, which is provided with a central tapped hole 7 for a purpose to be described later. A substantially circular shaped portion 8 of the clamp is adapted to embrace a battery terminal 9, and this portion 8 is cast thin enough to permit of bending, in order to clamp the invention tightly to the battery terminal. The circular portion 8 ends in a straight portion 10 extending substantially parallel to the wall 6. A hole 11 is provided in the straight portion 10 and is arranged so, that it registers with the tapped hole 7 in the wall 6. The hole 11 is of such size that a bolt 12 can extend through the said hole and the thread of the tapped hole 7 is such that it will fit the thread of the bolt 12. Preferably the head of the bolt is either a square head or a hexagon head, and has a slot 13 in its outer surface in order to permit the bolt to be tightened with a screw driver as well as with a wrench. The end of the bolt 12 is pointed as shown in Figure 2.

In order to connect the battery and the cable the insulation 4 of the cable is removed from the end of the cable and this skinned portion of the cable is then introduced into the bore of the tubular portion 3. The circular portion 8 is arranged in position on the battery 15 embracing the battery plug or terminal 9. Then the bolt 12 is inserted through the hole 11 and screwed into the hole 7. The cable is held by means of a pair of pliers from slipping out of the tubular portion 3, and the bolt is screwed further into the hole 7, whereby finally the circular portion 8 is clamped tightly around the battery terminal 9, and the point 14 of the bolt is driven into the cable thereby spreading the several wires forming the cable apart from each other. In this manner the cable itself will form a kind of a wedge inside the conical bore of the tubular portion 3 preventing the cable from slipping out of the said tubular portion.

What I claim as new and desire to secure by Letters Patent is:

1. On a clamp of the class described a tubular portion, a substantially circular portion, said tubular portion being adapted to receive the uncovered end of an electric cable, and means extending through the free end of the substantially circular portion and adapted to be forced into the tubular portion for spreading the different wires forming the cable apart from each other.

2. On a clamp of the class described, a substantially circular portion having on one end a substantially straight portion, and having on the other end a substantially tubular portion, said tubular portion being adapted to receive the uncovered end of an electric cable, an end wall closing the inner end of the tubular portion, hole in the straight portion, a second hole in the end wall and registering with the hole in the straight portion, and means extending through the two registering holes and adapted to be forced into the tubular portion for spreading the wire ends of the cable apart.

3. On a clamp of the class described a substantially circular portion, a straight portion on one end of said circular portion, a tubular portion on the other end of said substantially circular portion, the bore of the tubular portion being conically shaped, the small diameter of said cone being arranged at the mouth of the bore, an end wall closing the rear end of the bore, a hole in the straight portion, a tapped hole in the end wall registering with the first mentioned hole, a bolt adapted to extend through the hole in the straight portion and to be screwed into the tapped hole of the end wall, the end of said bolt being pointed and adapted to be forced into the cable arranged in the bore of the tubular portion.

In witness whereof I affix my signature.

CARL FISCHER.